(12) United States Patent
Rhodus

(10) Patent No.: US 7,044,528 B2
(45) Date of Patent: May 16, 2006

(54) WHEELED CARGO CONTAINER

(76) Inventor: Stanley Keith Rhodus, 2148 E. US Highway 36, Markleville, IN (US) 46056

( * ) Notice: Subject to any disclaimer, the term of this patent is extended or adjusted under 35 U.S.C. 154(b) by 86 days.

(21) Appl. No.: 10/904,711

(22) Filed: Nov. 24, 2004

(65) Prior Publication Data

US 2005/0127699 A1    Jun. 16, 2005

Related U.S. Application Data

(60) Provisional application No. 60/481,767, filed on Dec. 10, 2003.

(51) Int. Cl.
*B60N 3/12*    (2006.01)
(52) U.S. Cl. .................. 296/37.6; 224/404
(58) Field of Classification Search ............. 296/37.6, 296/37.1; 224/404
See application file for complete search history.

(56) References Cited

U.S. PATENT DOCUMENTS

| | | |
|---|---|---|
| 1,113,845 A | 10/1914 | Stevens |
| 4,085,961 A * | 4/1978 | Brown ............... 296/37.6 |
| 4,564,167 A * | 1/1986 | Smith ................ 248/552 |
| 4,722,646 A | 2/1988 | McIntyre |
| 4,733,898 A | 3/1988 | Williams |
| 4,733,899 A | 3/1988 | Keys |
| 4,763,944 A | 8/1988 | Fry et al. |
| 4,909,558 A | 3/1990 | Roshinsky |
| 4,971,234 A | 11/1990 | Hay |
| 5,167,479 A | 12/1992 | Bott |
| 5,240,301 A | 8/1993 | Arnold |
| 5,352,008 A | 10/1994 | Denvir |
| 5,366,124 A | 11/1994 | Dearborn, IV |
| 5,398,987 A | 3/1995 | Sturgis |
| 5,439,151 A | 8/1995 | Clayton |
| 5,597,193 A | 1/1997 | Conner |
| 5,961,263 A | 10/1999 | Nunez |
| 6,007,128 A * | 12/1999 | Hines, Jr. ............ 296/37.6 |
| 6,015,178 A | 1/2000 | Haack |
| 6,082,800 A | 7/2000 | Schambre et al. |
| 6,203,087 B1 | 3/2001 | Lance et al. |
| 6,340,190 B1 | 1/2002 | Rosebrugh et al. |
| 6,513,688 B1 | 2/2003 | Kmita et al. |
| 6,557,918 B1 | 5/2003 | Iafrate et al. |
| 6,561,560 B1 | 5/2003 | Brown et al. |
| 6,601,899 B1 | 8/2003 | Kiester et al. |
| 6,715,973 B1 | 4/2004 | Faber et al. |
| 2003/0189353 A1 * | 10/2003 | Moore ............... 296/37.6 |

* cited by examiner

*Primary Examiner*—Joseph D. Pape

(57) ABSTRACT

The wheeled cargo container for a pickup or other similar vehicle is a cargo box that will swing out to facilitate the loading of cargo. The design allows the weight of the box and the cargo placed into it to be carried by the shoulder of the hinge bracket and the wheel or wheels. The weight therefore is not a hanging weight as would be the case of a door on its hinges. When the wheeled cargo container is retracted to the out position it stops directly above the tailgate. This allows a person to load cargo without the need to bend over to reach past the tailgate and into the bed of pickup or other similar vehicle. When the wheeled cargo container is retracted into the bed of a vehicle it is kept in place by a bumper that rests against the inside of the tailgate of said vehicle. The container therefore cannot move while the vehicle is in motion and the tailgate is closed. When the container is retracted into the bed, approximately one half of the bed of the vehicle is available to load items that are too long to fit inside of the wheeled cargo container.

4 Claims, 4 Drawing Sheets

WHEELED CARGO CONTAINER

STATEMENT REGUARDING FEDERALLY SPONSORED RESEARCHED OR DEVELOPMENT

There has been no federally sponsored research or development included in this invention or application. There are no federal funds being used in its development or application.

INCORPORATION-BY-REFERENCE OF MATERIAL SUBMITTED ON A COMPACT DISK COMPACT DISK

Not Applicable

BACKGROUND OF THE INVENTION

1. Field of the Invention

This invention relates to a cargo box that is mounted inside of the bed of a pickup truck. The said cargo box will swing out allowing loading of groceries and other cargo directly above the tailgate and containing said cargo.

2. Background Art

Not Applicable

BRIEF SUMMARY OF THE INVENTION

When groceries or other smaller cargo are loaded into the bed of a pickup truck one must reach past the tailgate to load into the bed. Once the cargo is loaded it is not contained in a smaller area but rather moves anywhere within the bed of the pickup truck.

The Wheeled Cargo Container will solve both of these problems. The Wheeled Cargo Container is hinged to allow it to "swing out" so it will set directly above the tailgate so one would not need to reach past said tailgate to load the groceries or cargo. The container itself would contain any items placed inside of it.

BRIEF DESCRIPTION OF THE SEVERAL VIEWS OF THE DRAWINGS

The invention may be understood by reference to the following detailed description of a preferred embodiment of the invention which follows, reference being made to the accompanying drawings in which.

DETAILED DESCRIPTION OF THE INVENTION

The invention relates to a wheeled cargo container comprising of four walls a bottom, a bracket, hinges and wheels that form an interior having an inner bottom.

The wheeled cargo container will mount to a bracket that is installed on the inside of a bed of a Pickup truck or similar vehicle. When mounted the wheeled cargo container will "swing" out and set right above the tailgate of said vehicle to facilitate the loading of cargo. The wheeled cargo container will then be able to be pushed easily back into the bed of said vehicle in a swinging motion kind of like swinging a door open or closed.

In this context, the container refers to a container or a similar transport receptacle, which is of the type intended for transporting goods within a truck, pickup or similar vehicle. Reference throughout this specification to a container is to be taken as a reference to a wheeled cargo container of the type as described above.

Cargo and groceries loaded into the bed of a Pickup truck or similar vehicle are normally not contained. Said cargo therefore moves within the bed causing damage to the cargo. Cargo is difficult to retrieve from bed of pickup if it moves to the front of said pickup.

If said pickup truck or similar vehicle bed is covered, as is the case with many newer type pickup trucks, loading the cargo is difficult. One must stand at the rear of the vehicle to load groceries or other cargo. When the tailgate is placed down to load the person would then need to reach OVER and past the tailgate to load cargo into the bed of said vehicle.

The object of the invention is to provide a wheeled cargo container, by which the above-described problems can be solved.

The objects of the invention are achieved by a wheeled cargo container, which is characterized by what is disclosed herein.

The preferred embodiments of the invention are also disclosed herein.

Figure 1:
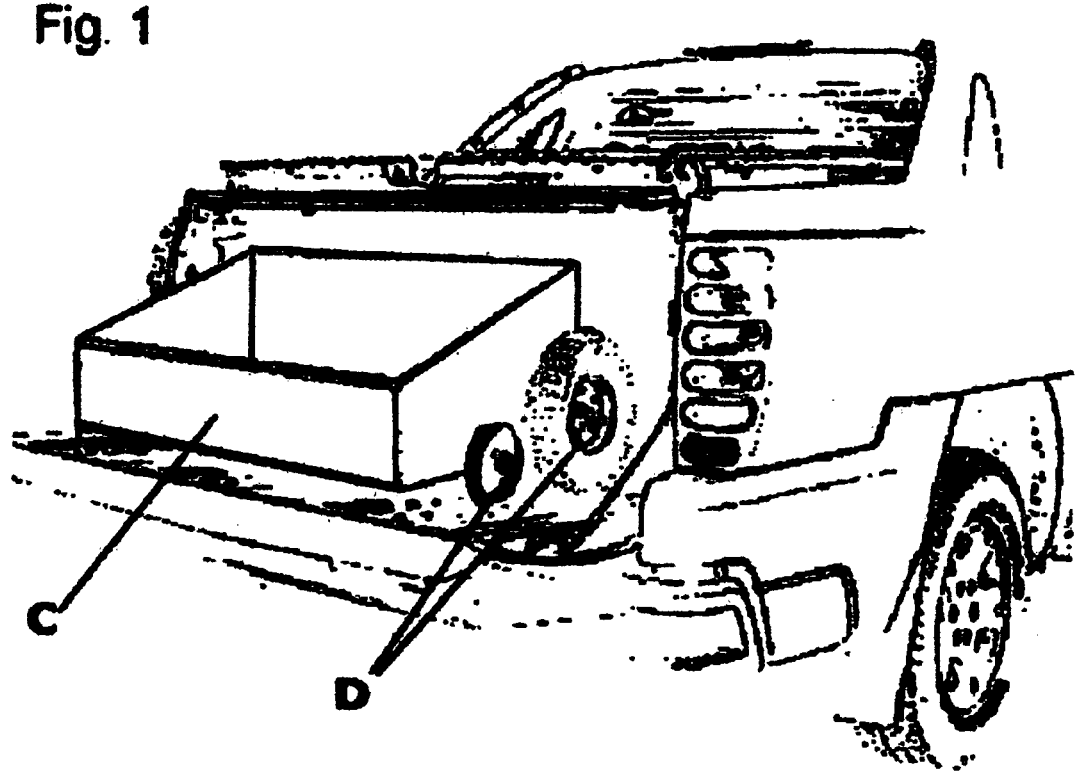
FIG. 1 Shows the Wheeled Cargo Container [C] mounted into a pickup type vehicle and resting in the "out" position directly above the tailgate for loading groceries and cargo. It also shows the wheels [D] that allow it to "swing" into the bed easily and carry the weight of cargo loaded into it.

The wheeled cargo container has an advantage that allows it to "swing" out to facilitate loading of groceries or other cargo. When it is in the out position as shown in FIG. 1, the wheeled cargo container rests just above the tailgate. The advantage is that it will hold heavy goods in a container without needing to reach into the bed of the vehicle to load. The wheeled cargo container has another advantage that it does not require any packing material for supporting the goods in the container. This saves material.

Figure 4:
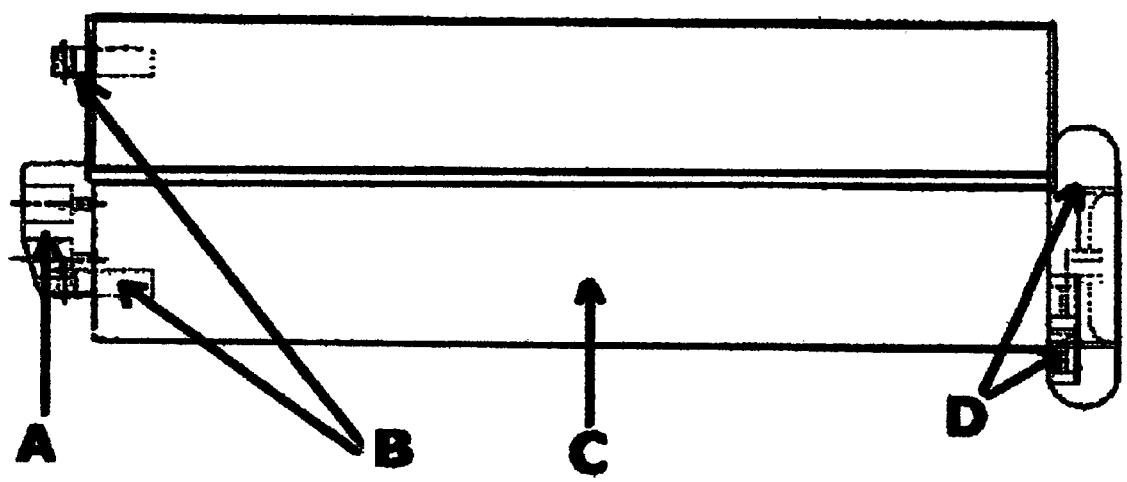
FIG. 4 Shows a detailed front view of the Wheeled Cargo Container. It shows the box [C] the bumper [A] and the strap part of the hinged [B] that will meet the flange on the bracket that will keep the Wheeled Cargo Container from opening too wide. It shows the wheels [D] that will help carry the weight of the Wheeled Cargo Container and any cargo loaded into it.

The Wheeled Cargo Container advantageously comprises at least:

1. Cargo Box as shown in FIG. 1 letter C and FIG. 2 Letter C and FIG. 4 Letter C.

Figure 2:
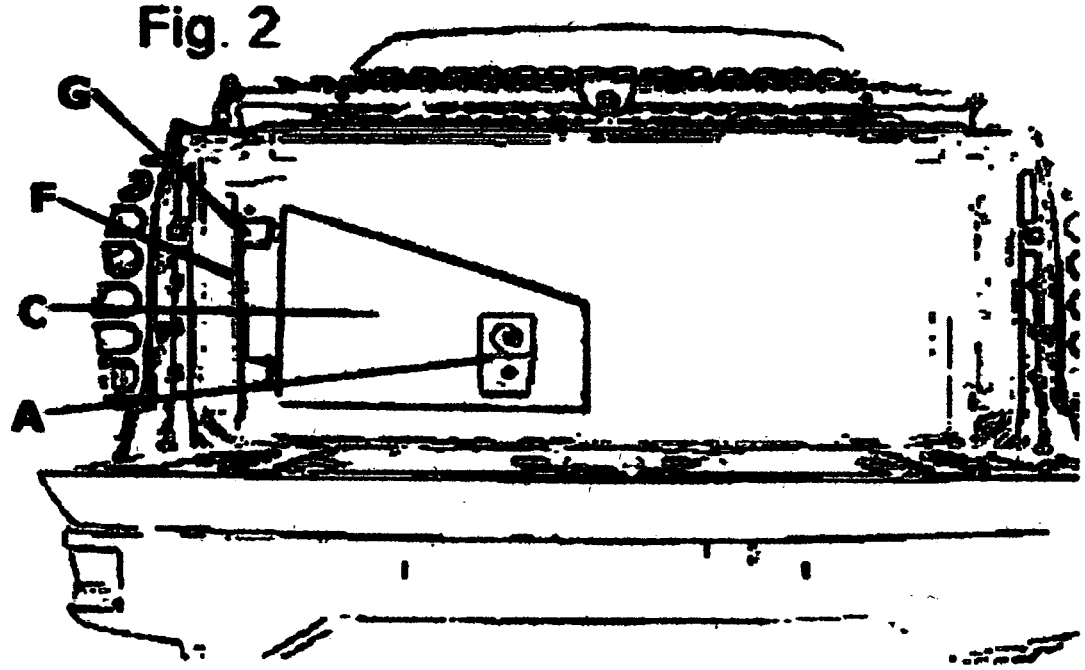
FIG. 2 Shows the Wheeled Cargo Container retracted back into the bed of a pickup truck. It also shows the bumper [A] that rests against the inside of the tailgate when it is closed to keep the Wheeled Cargo Container from moving while the pickup truck is in motion.

2. A bracket that will mount into the bed of a pickup truck or pickup or other similar vehicle as shown in FIG. 2 Letter F and FIG. 3. Letter F.

3. Hinge system that consists of parts of hinge affixed to the box and parts of hinge and a stop flange affixed to the bracket as shown in FIG. 2 Letters F and G and FIG. 3 Letters F and G.

4. Wheels as shown in FIG. 1 letter D and FIG. 4 Letter D.

5. Bumper as shown in FIG. 2 Letter A and FIG. 4 Letter A that will hold the Wheeled Cargo Container in place while the pickup truck or other similar vehicle is in motion.

The cargo box described in number paragraph 8 number 1 above is composed of materials that are strong and will carry a sufficient amount of weight in relation to the size of the container. These materials can be various metals, plastics or any other material as technology advances.

The hinges as described in paragraph 8 number 2 above when mated will allow the Wheeled Cargo Container to "swing" out in an arc and rest directly above the tailgate as shown in FIG. 1.

Figure 3:
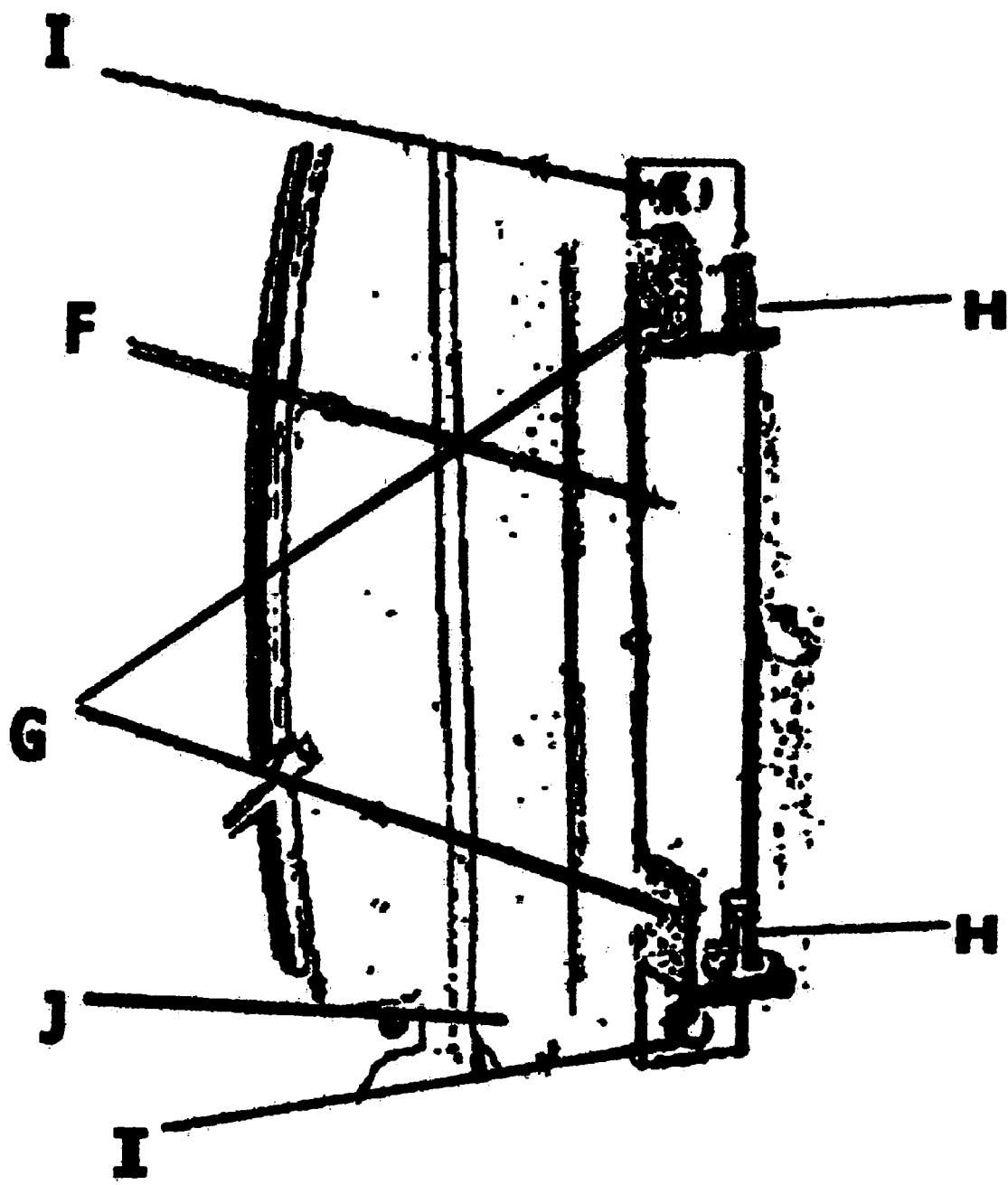
FIG. 3 Shows the bracket [F] that is mounted inside of the pickup bed [J]. The Wheeled Cargo Container will set on the pins [H] of this bracket. This bracket has stop flanges [G] that will mate with the hinge straps shown in FIG. 4 [B] that will keep the Wheeled Cargo Container from opening to wide and causing possible damage to the vehicle in which it is installed.

The bracket described in paragraph 8 number 2 above will be mounted inside of a pickup truck or similar vehicle as shown in FIG. 3 Letter I.

If said pickup truck or similar vehicle has the wheel wells inside of the bed of the truck, this bracket will be offset to allow the cargo box to set parallel to the side of the bed when retracted to the in position.

The bracket described in paragraph 8 number 2 above is designed to act as the hinge and to prevent the Wheeled Cargo Container from opening to wide by utilizing a stop flange as shown in FIG. 2 Letter G and FIG. 3 Letter G of the attached drawings.

The wheels described in paragraph 8 number 4 above will be of sufficient size and strength to carry any weight that could be loaded into the container Wheeled Cargo Container. They will consist of a larger wheel to carry most of the weight and a smaller wheel that wll keep the natural flex out of the cargo box.

The larger wheel described in paragraph 14 will be mounted in a position that will allow said wheel to protrude past the rear of the cargo container. This wheel will act as a cushion or bumper for the side of the pickup or other similar vehicle while the wheeled cargo container is retracted into the bed.

The bumper described in paragraph 8 number 5 above will be made from rubber or other material strong enough to prevent any movement of the Wheeled Cargo Container while the tailgate is closed and the pickup or similar vehicle is in motion.

What is claimed is:

1. A wheeled cargo container assembly for use in the bed of a pickup or other similar vehicle, the bed including opposite side walls, a tailgate and a horizontal load support surface, said assembly comprising:
   a cargo container having a bottom wall, a front wall, a back wall, a first side wall and a second side wall,
   a pair of wheels being mounted by axles to the first side wall of the cargo container,
   a pair of vertically spaced hinge straps mounted to the end of the cargo container opposite to that on which the wheels are mounted,
   a bracket mounted to an inner rear portion of a side wall of the bed, the bracket including a pair of vertically spaced and vertically oriented hinge pins, wherein the hinge straps are mounted on the hinge pins for pivotal movement of the cargo container about the hinge pins with the wheels providing support for the cargo container by rollably contacting a horizontal surface of the bed and tailgate when in an open position, and
   a bumper on the second sidewall of the cargo container in engagement with the tailgate when the cargo container is in a stowed position and the tailgate is in a closed position to prevent movement of the cargo container during transport.

2. The cargo container assembly of claim 1, wherein the cargo container swings out from a stowed position to a loading or unloading position in about a 90 degree arc with the stowed position being parallel to the side wall of the bed, whereby the loading of long items within the bed is permitted, and the loading or unloading position being such that the cargo container sits directly above the tailgate while the tailgate is in the open position, whereby items may be easily loaded or unloaded from the cargo container without having to reach over the entire width of the open tailgate.

3. The cargo container assembly of claim 1, further comprising a pair of stop flanges on the bracket adjacent to the pair of hinge pins, and a stop on each hinge strap, whereby the stop flanges on the bracket and the stops on the hinge straps will engage when the cargo container has reached a fully open, loading and unloading position, whereby damage to the assembly or the bed is prevented.

4. The cargo container assembly of claim 1, wherein the hinge straps are mounted to the hinge pins by sliding the hinge straps down over the hinge pins, whereby the cargo container may be selectively mounted or removed from the bracket without the use of tools.

\* \* \* \* \*